Feb. 22, 1938.   O. GUERNSEY   2,109,420
CLUTCH CONTROL APPARATUS
Filed July 16, 1932   2 Sheets-Sheet 1

Inventor:—
Charles O. Guernsey
by his Attorneys
Howson & Howson

Feb. 22, 1938.   C. O. GUERNSEY   2,109,420
CLUTCH CONTROL APPARATUS
Filed July 16, 1932   2 Sheets-Sheet 2

Patented Feb. 22, 1938

2,109,420

UNITED STATES PATENT OFFICE 2,109,420

CLUTCH CONTROL APPARATUS

Charles O. Guernsey, Yeadon, Pa.

Application July 16, 1932, Serial No. 622,948

23 Claims. (Cl. 192—.01)

This invention relates to clutch control apparatus, and more particularly to means for automatically controlling the rate of engagement of the elements of power-operated clutches by the acceleration or deceleration of one of the elements.

An important object of the invention is the provision of apparatus of this character so arranged that the clutch operation is rendered substantially entirely automatic, thereby enabling the same to be properly controlled by unskilled operators.

A further, and more specific, object of the invention is the provision of means employing the inertia forces generatable as the result of speed changes in the elements of the clutch for controlling the operation of automatic clutches, thereby adapting the clutch for use in the present day motor vehicle.

These and other objects I attain by the construction shown in the accompanying drawings wherein, for the purpose of illustration, I have shown a preferred embodiment of my invention and wherein.

Figure 1:
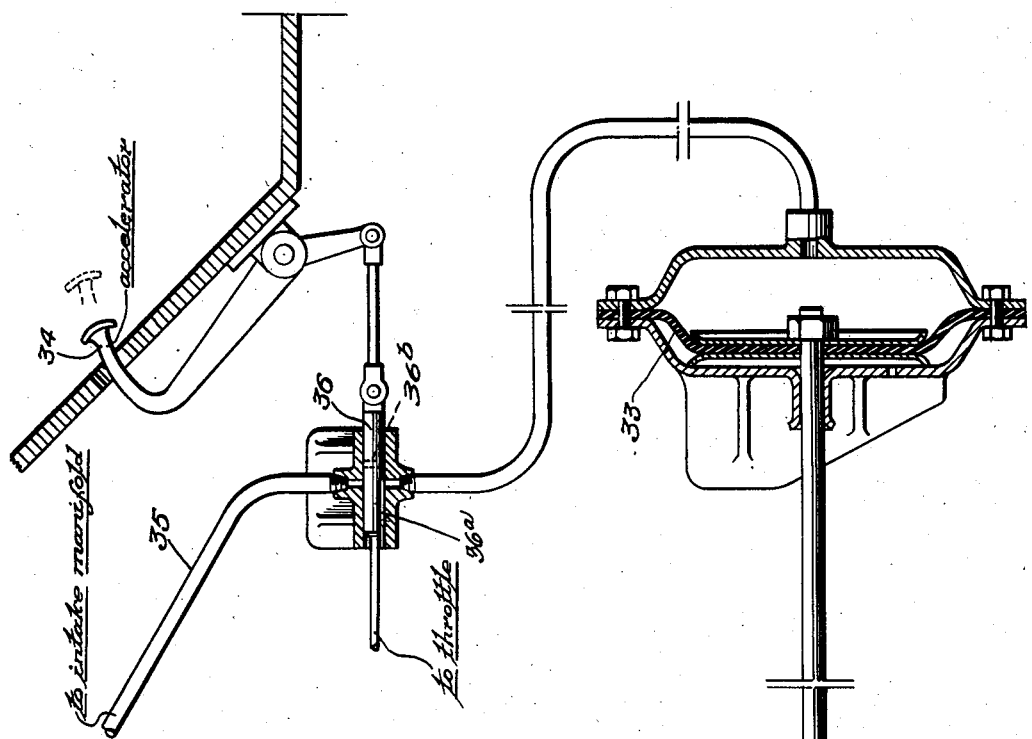
Fig. 1 is a sectional view partially diagrammatic, showing a clutch control constructed in accordance with my invention applied to a power-operated clutch.
Figure 1:
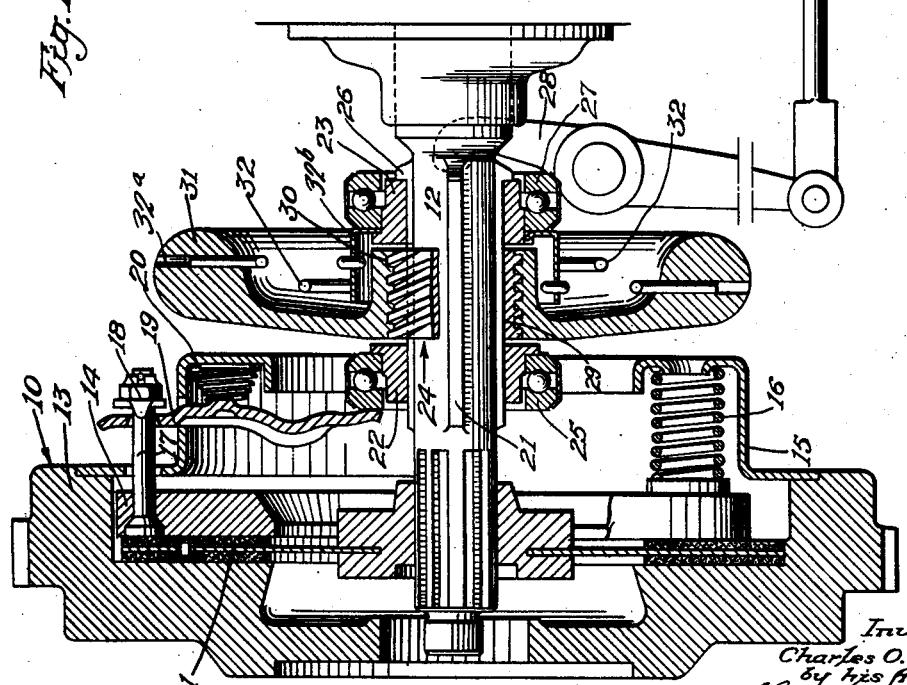

Referring now more particularly to Fig. 1 of the drawings, the numeral 10 generally designates the driving, and 11 the driven element of a clutch, the latter being mounted upon and held against rotation with relation to a shaft 12 to be driven as, for example, the propeller shaft of an automobile. The clutch may be of any usual or ordinary construction in its general arrangement, being at present shown as including in the driving element relatively stationary and movable plates 13 and 14 adapted to clamp upon the driven element 11 and as further including a housing plate 15 between which and the movable plate of the driving element are disposed springs 16 for urging the movable element into clamping engagement. This housing has directed therethrough pins 17 having heads 18 operated upon by levers 19 pivoted against the walls of housing 15 and having associated therewith the usual anti-rattling springs 20.

Figure 3:
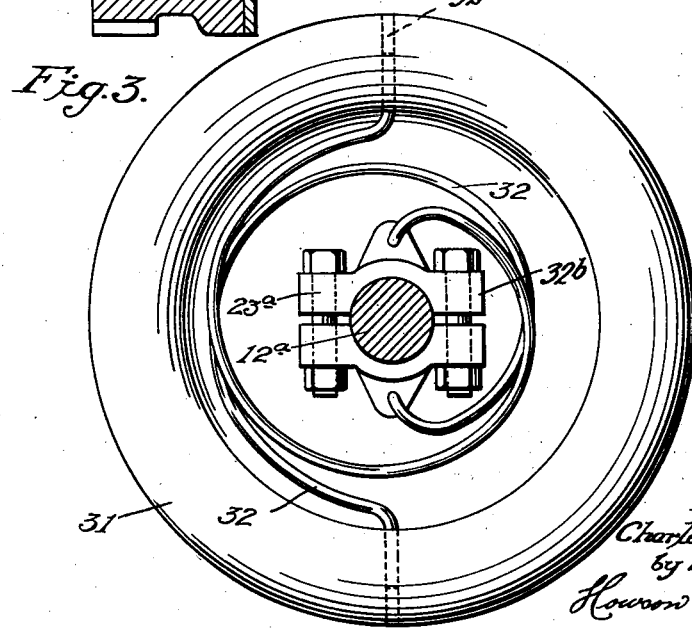
Fig. 3 is a section on line 3—3 of Fig. 2 illustrating a characteristic spring arrangement for controlling the inertia element.

In accordance with my invention, as illustrated in Fig. 1, I provide upon shaft 12 a spline 21 upon which are mounted collars 22 and 23 having arranged therebetween a two-part sleeve and nut generally designated at 24. The collar 22 engages the inner ends of levers 19 through the intermediary of an anti-friction bearing 25. The other collar 23 is limited in its separation from the collar 22 through shoulders 26 and this collar operatively engages, through a thrust bearing 27, against a rocker arm 28 forming part of an operating train hereinafter more particularly described. The sleeve and nut 24 comprises an inner section 29 longitudinally slidable upon the spline and exteriorly threaded for co-operation with the outer section 30, which outer section bears a spaced and relatively heavy rim 31 constituting an inertia weight. Inertia weight 31 is yieldably held against rotation with relation to shaft 12 by means of springs, the invention in the present illustration including two oppositely spirally coiled springs 32 as more clearly shown in Fig. 3 where a typical inertia weight construction is illustrated. These springs have their outer ends outturned and inserted in sockets 32a in the rim 31 and their inner ends anchored in an anchor member 32b stationary with relation to the driven shaft.

In Fig. 1 the apparatus has been illustrated as the clutch of an internal combustion engine and the lever arm 28 as actuated through a diaphragm 33 under direct control of the accelerator pedal 34 controlling the speed of the engine. Any suitable means for energizing the actuator may be employed, the apparatus at present illustrated being a connection 35 of the diaphragm cylinder with the intake manifold of the engine, which connection includes a valve 36 operated by the accelerator pedal. When the accelerator pedal is elevated to reduce the speed of operation of the engine, a port 36b in valve 36 is brought into alignment with ports in the valve casing, thereby drawing diaphragm 33 to the right, due to subatmospheric pressure being developed in the connection to the engine intake manifold, and moving collar 23 upon the spline 21. Through extensible mechanism 24 this movement is imparted to collar 22 and from this collar to the fingers 19, thereby disengaging the sections of the driving element of the clutch from the driven element.

When the speed of operation of the engine is increased, the vacuum connection is discontinued and air admitted through port 36a, with the result that the springs 16 may act to reengage the sections of the clutch. If at this time the relative speeds of the driving and driven elements are not identical, or nearly so, the inertia weight will be displaced with relation to shaft 12 against the action of springs 32. As a result the sections of sleeve 24 are relatively rotated and, accordingly, the sleeve 24 is elongated, increasing the distance between the collars 22 and 23. Since collar 23 is positively limited in its movement, collar 22 is forced into engagement with levers 19, thereby disengaging the sections of the driving element 10 from the driven element 11. The temporary engagement of the clutch elements will, of course, tend to correct the variation in speeds and when the clutch is released, springs 32 will again act to restore weight 31 to its normal position, thereby permitting the clutch sections to again engage. Thus, by a series of engagements, the speeds of the driving and driven elements are made identical, after which the clutch remains in continuous engagement.

Figure 2:
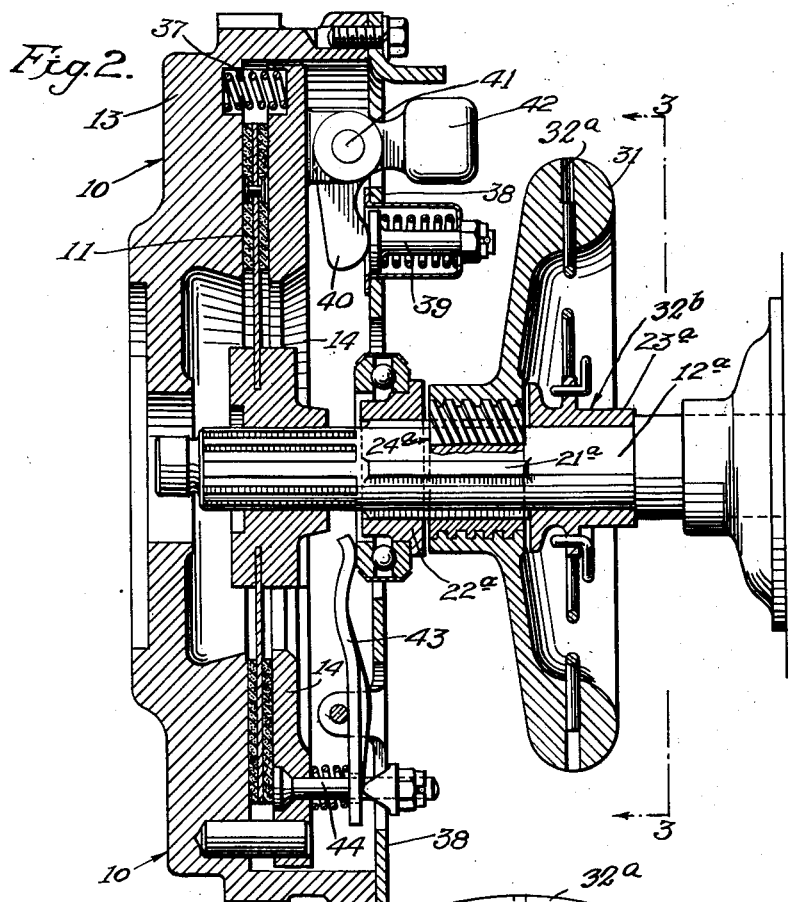
Fig. 2 is a vertical sectional view showing the clutch control as applied to a centrifugal clutch.

In the form shown in Fig. 2, the invention is illustrated as applied to a centrifugal clutch in which the driving clutch element 10 has its stationary and moving plates 13 and 14 normally held apart by springs 37. The housing plate 38 of this clutch mounts spring-pressed plungers 39 acting upon the tails of bell crank levers 40 which are pivoted at 41 to the movable plate of the driving element of the clutch and which have their outer ends formed as weights 42 acting when the clutch attains a predetermined speed to apply pressure to the movable plate 14 and cause the engagement of the clutch elements. The cover plate 38 forms a pivotal support for levers 43 acting upon the movable plate through pins 44, the inner ends of these levers engaging a movable collar 22a corresponding in function and position to the collar 22 of the structure of Fig. 1. The extensible mechanism 24a and its associated parts is, likewise, constructed similarly to the structure of Fig. 1, but for the collar 23 a stationary collar 23a is substituted and clamped upon the shaft 12a rearwardly of the spline 21a. It will be obvious that with a structure of this character, when the driving element of the clutch attains a predetermined speed the clutch weights 42 will act to engage the sections of the clutch and so to drive shaft 12a. In this structure, as in the previous structure, any difference in the speeds of the shaft 12a and of the driving element of the clutch at the time of such engagement will result in a movement of the inertia weight elongating the extensible mechanism 24a and moving collar 22a to the left so that the levers 43 are operated to disengage the clutch sections.

Since the structures illustrated are, obviously, capable of considerable modification without departing from the spirit of my invention, I do not wish to be understood as limiting myself thereto except as hereinafter claimed.

I claim:

1. In a clutch control, the combination with a clutch including driving and driven elements, and means to engage said elements at a predetermined speed of the driving element, of means responsive to variations in the speed of one of the elements for controlling the rate of engagement of the elements by said engaging means.

2. In a clutch control, the combination with a clutch including driving and driven elements, and means to engage said elements at a predetermined speed of the driving element, of inertia-operated means responsive to variations in the speed of one of the elements for controlling the rate of engagement of the elements by said engaging means.

3. In a clutch control, the combination with a clutch including driving and driven elements, means to engage said elements, and a shaft to which the driven element is secured, of a pair of abutments on said shaft one of which is movable on the shaft and operatively engages the clutch to effect disengagement of the driving and driven elements upon separation of the abutments, and means to separate said abutments responsive to variations in the speed of one of the elements for controlling the rate of engagement of the elements by said engaging means.

4. In a clutch control, the combination with a clutch including driving and driven elements, means to engage said elements, and a shaft to which the driven element is secured, of a pair of abutments on said shaft one of which is movable on the shaft and operatively engages the clutch to effect disengagement of the driving and driven elements upon separation of the abutments, and inertia-operated means to separate said abutments responsive to variations in the speed of one of the elements.

5. In a clutch control, the combination with a clutch including driving and driven elements, means to engage said elements, and a shaft to which the driven element is secured, of a pair of abutments on said shaft one of which is movable on the shaft and operatively engages the clutch to effect disengagement of the driving and driven elements upon separation of the abutments, an extensible mechanism between said abutments, and means responsive to variations in the speed of one of the elements for extending said extensible mechanism.

6. In a clutch control, the combination with a clutch including driving and driven elements, means to engage said elements, and a shaft to which the driven element is secured, of a pair of abutments on said shaft one of which is movable on the shaft and operatively engages the clutch to effect disengagement of the driving and driven elements upon separation of the abutments, an extensible mechanism between said abutments, and inertia-operated means responsive to variations in the speed of one of the elements for extending said extensible mechanism.

7. In a clutch control, the combination with a clutch including driving and driven elements, means to engage said elements, and a shaft to which the driven element is secured, of a pair of abutments on said shaft, said abutments being held against relative rotation and being longitudinally movable upon the shaft, one of said abutments operatively engaging the clutch to effect disengagement of the driving and driven elements upon separation of said abutments, an extensible mechanism between the abutments, power-operated means to move the other of the abutments and inertia-operated means for elongating said extensible mechanism.

8. In a clutch control and in combination with a clutch including driving and driven elements, centrifugally-operated means for connecting said elements at a predetermined speed of the driving element and inertia-operated means for controlling the rate of such engagement.

9. In a clutch control and in combination with a clutch including driving and driven elements, means to engage said elements at a predetermined speed of the driving element, a shaft driven by the driven element, an extensible mechanism surrounding said shaft, inertia-operated means for extending said mechanism, and means for disconnecting the clutch upon extension of said mechanism.

10. In a clutch control, the combination with a clutch including driving and driven elements, means to engage said elements at a predetermined speed of the driving element and a shaft to which the driven element is secured, of a pair of abutments on said shaft, one of which is movable on the shaft and operatively engages the clutch to effect disengagement of the driving and driven elements upon separation of the abutments, an extensible mechanism between said abutments, comprising a two-part sleeve one of said parts being splined to said shaft, the other of the parts having threaded engagement with the first-named part and having a projecting flange provided with a peripheral inertia weight and spring means to maintain said inertia weight in yieldably fixed relation to the shaft.

11. In a clutch control, the combination with a clutch including driving and driven elements, means to engage said elements at a predetermined speed of the driving element, and a shaft to which the driven element is secured, of a pair of abutments on said shaft one of which is movable on the shaft and operatively engages the clutch to effect disengagement of the driving and driven elements upon separation of the abutments, an extensible mechanism between said abutments, and means responsive to variations in the speed of one of the elements for extending said extensible mechanism, the other of said abutments being fixed upon the shaft.

12. In a clutch control, the combination with a clutch including driving and driven elements, means to engage said elements at a predetermined speed of the driving element and a shaft to which the driven element is secured, of a pair of abutments on said shaft, one of which is movable on the shaft and operatively engages the clutch to effect disengagement of the driving and driven elements upon separation of the abutments, and extensible mechanism between said abutments, comprising a two-part sleeve one of said parts being splined to said shaft, the other of the parts having threaded engagement with the first-named part and having a projecting flange provided with a peripheral inertia weight and spring means to maintain said inertia weight in yieldably fixed relation to the shaft, the other of said abutments being fixed upon the shaft.

13. In a clutch control, the combination with a clutch including driving and driven elements, means to engage said elements at a predetermined speed of the driving element, and a shaft to which the driven element is secured, of a pair of abutments on said shaft one of which is movable on the shaft and operatively engages the clutch to effect disengagement of the driving and driven elements upon separation of the abutments, an extensible mechanism between said abutments, and inertia-operated means responsive to variations in the speed of one of the elements for extending said extensible mechanism, the other of said abutments being fixed upon the shaft.

14. In a clutch control, the combination with a clutch including driving and driven elements, means to engage said elements, and a shaft to which the driven element is secured, of a pair of abutments on said shaft one of which is movable on the shaft and operatively engages the clutch to effect disengagement of the driving and driven elements upon separation of the abutments, an extensible mechanism between said abutments, and inertia-operated means responsive to variations in the speed of one of the elements for extending said extensible mechanism, the means to engage said elements comprising power-operated means for shifting the other of said abutments upon the shaft.

15. In a clutch control, the combination with a clutch including driving and driven elements, means to engage said elements, and a shaft to which the driven element is secured, of a pair of abutments on said shaft one of which is movable on the shaft and operatively engages the clutch to effect disengagement of the driving and driven elements upon separation of the abutments, and inertia-operated means to separate said abutments responsive to variations in the speed of one of the elements, the means to engage said elements comprising power-operated means for shifting the other of said abutments upon the shaft.

16. In a clutch control, the combination with a clutch including driving and driven elements, means to engage said elements, and a shaft to which the driven element is secured, of a pair of abutments on said shaft one of which is movable on the shaft and operatively engages the clutch to effect disengagement of the driving and driven elements upon separation of the abutments, an extensible mechanism between said abutments, and means responsive to variations in the speed of one of the elements for extending said extensible mechanism, the means to engage said elements comprising power-operated means for shifting the other of said abutments upon the shaft.

17. In a clutch control, the combination of a friction clutch having driving and driven elements with power-operated means for engaging and disengaging said elements, and inertia operated means acting directly on one of the elements for controlling the rate of such engagement.

18. In a clutch control, the combination of a friction clutch having driving and driven elements and means to engage said elements, with means responsive to a change in speed of one of said elements and acting directly on one of the elements for determining the rate of engagement of said elements.

19. In a clutch control and in combination with a clutch including driving and driven elements, centrifugally-operated means for connecting said elements at a predetermined speed of the driving element, and inertia-operated means acting directly on one of said elements for controlling the rate of such engagement.

20. In a clutch control and in combination with a clutch including driving and driven elements, means to engage said elements, a shaft driven by the driven element, an extensible mechanism surrounding said shaft, inertia-operated means for extending said mechanism, and means for disconnecting the clutch upon extension of said mechanism.

21. In a clutch control, the combination with a clutch including driving and driven elements, means to engage said elements and a shaft to which the driven element is secured, of a pair of abutments on said shaft, one of which is movable on the shaft and operatively engages the clutch to effect disengagement of the driving and driven elements upon separation of the abutments, an extensible mechanism between said abutments, comprising a two-part sleeve one of said parts being splined to said shaft, the other of the parts having threaded engagement with the first-named part and having a projecting flange provided with a peripheral inertia weight and spring means to maintain said inertia weight in yieldably fixed relation to the shaft.

22. In a clutch control, the combination with a clutch including driving and driven elements, means to engage said elements and a shaft to which the driven element is secured, of a pair of abutments on said shaft one of which is movable on the shaft and operatively engages the clutch to effect disengagement of the driving and driven elements upon separation of the abutments, an extensible mechanism between said abutments, and means responsive to variations in the speed of one of the elements for extending said extensible mechanism, the other of said abutments being fixed upon the shaft.

23. In a clutch control, the combination with a clutch including driving and driven elements, means to engage said elements and a shaft to which the driven element is secured, of a pair of abutments on said shaft one of which is movable on the shaft and operatively engages the clutch to effect disengagement of the driving and driven elements upon separation of the abutments, an extensible mechanism between said abutments, and inertia-operated means responsive to variations in the speed of one of the elements for extending said extensible mechanism, the other of said abutments being fixed upon the shaft.

CHARLES O. GUERNSEY.